Nov. 24, 1970  G. OTTO  3,541,867
PROGRAMMING DEVICE FOR WATER SOFTENING PLANTS
Filed Feb. 8, 1968  3 Sheets-Sheet 1

Inventor:
GUENTHER OTTO

BY: Craig & Antonelli
ATTORNEYS

INVENTOR.
GÜNTHER OTTO

United States Patent Office 3,541,867
Patented Nov. 24, 1970

3,541,867
PROGRAMMING DEVICE FOR WATER SOFTENING PLANTS
Günther Otto, Hildesheim, Germany, assignor to Gebrueder Heyl KG Gesellschaft, fur Analysentechnik, Hildesheim, Germany
Filed Feb. 8, 1968, Ser. No. 704,165
Claims priority, application Germany, Feb. 9, 1967, H 61,793
Int. Cl. F16h 5/74
U.S. Cl. 74—3.5                                              14 Claims

ABSTRACT OF THE DISCLOSURE

An improved programming device for water softening plants, actuated by a water flow meter and including a meter disk driven through a reduction and coupled with a coaxially mounted switch disk, with return spring and adjustable switch arm, further including a mechanical transmission coupling link for transmitting the movement of the metering disk to the switch disk and a cam controlled release arm for the coupling, controlled as a function of the movement of the program disk of the programming device.

---

Figures 1, 2:
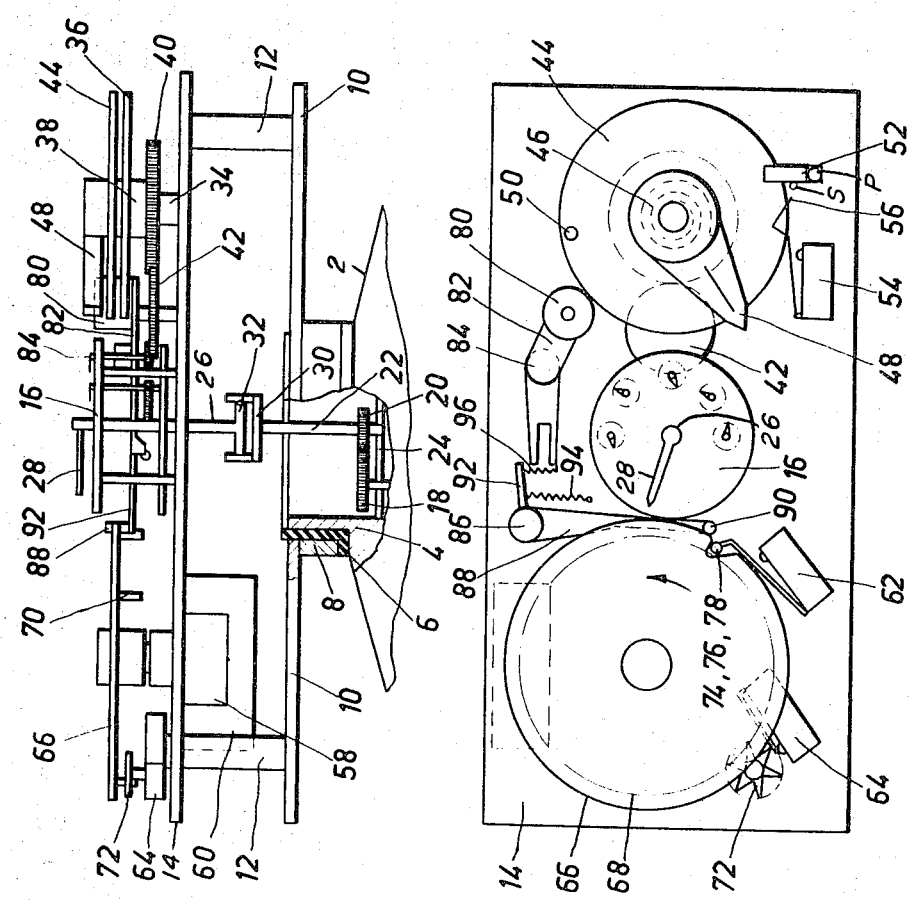

In water softening plants, the regeneration of the water softener is generally effected fully automatically as a function of the quantity of softened water. Since the degree of hardness of the water and the efficiency of the softener are known, optimum utilization of the softening plant may thereby be achieved, with the most economical use of the saline solution required for the regeneration.

Known plants use water meters in which the metering disk arranged on the water meter is magnetically coupled with the switching disk.

The program control for the generation, whereby the valves arranged on the softening vessel are actuated in a predetermined sequence, is normally mounted directly on the softener tank. In addition thereto, known plants also require a retarding relay. After the passage therethrough of the predetermined quantity of water, the water meter delivers a switching impulse to the delaying relay. This relay releases the magnetic coupling for a certain period of time so that the switching arm and the switching disk are returned by the return spring into the original positions. At the same time, the relay closes the circuit of the actuating motor of the programming device, until a holding contact, actuated by the switching disk of the programming device, is closed. After the completion of the program, this holding contact opens, and de-energizes the drive motor of the programming device.

Known plants are expensive, especially in view of the electrical switching elements, and these plants require substantial investments.

The present invention has the object of providing a programming device of the type hereinbefore described, which is easy and simple to manufacture, to assemble and to maintain, and which can be produced in a very compact and operationally reliable form.

According to the invention, this object is realized in that the transmission of the movement of the metering disk to the switching disk is achieved by a mechanical clutch coupling, and the latter is actuated by a cam controlled release arm, controlled as a function of the programming disk of the programming device.

The programming device, the water meter, and the switching means acting as a function of the flow quantity may be housed in a comparatively small housing directly on the water meter, so that the assembly requires only a power connection for the apparatus and connections to the magnets of the magnetic valves.

The mechanical clutch coupling may be a friction wheel, resting on the outer periphery of the switching and metering disk under pressure, and adapted to be lifted off by the said release arm. Conveniently, the switching and metering discs have a conically shaped periphery, whilst the periphery of the friction wheel has a rounded cross-section.

The friction wheel may be mounted on one arm of a two-armed lever and be rotatable thereon, whilst the other arm of this level co-operates with a lug on the pivotably mounted release arm. The biasing spring for the friction wheel is preferably arranged between the said two-armed lever and the lug on the release arm.

Preferably, the release arm rests on the outer periphery of the programming disk, and the programmings disk has a short groove into which the release arm engages and which has at the leading end, as viewed in the direction of rotation of the disk, a steep shoulder, whereby a high switching speed is achieved.

Preferably, also the holding contact of the programming device is controlled by the outer periphery of the program disk and the holding contact is so arranged that the actuating arm of the holding switch is located in the peripheral groove, when the programming device is inoperative.

Programming devices according to the invention may also be equipped only with a switching disk. In this construction, therefore, the metering disk may be omitted.

In the first embodiment, the switching disk carries on its outer periphery a ratchet toothing, whilst there is also provided a ratchet mechanism with a holding ratchet and a switching ratchet actuated by the meter mechanism, and the release arm is provided with means whereby the switching ratchets can be disengaged from the switching wheel.

In a further embodiment of the invention, the driven gear of the meter is mounted on a rocker located on the shaft of the gear in front of it and engages directly or indirectly with the switching disk. The switching disk may be equipped with a toothing which meshes with the driven meter gear, for example, along its outer periphery. The said toothing may be arranged, for example, on the outer periphery of the switch disk. However, it is also possible to connect the switch disk with a gear mounted coaxially relative thereto.

In yet another embodiment of the invention, the switch disk may be connected by a toothing with the meter mechanism, and one of the gear with a disengageable axial clutch coupling.

Figure 3:
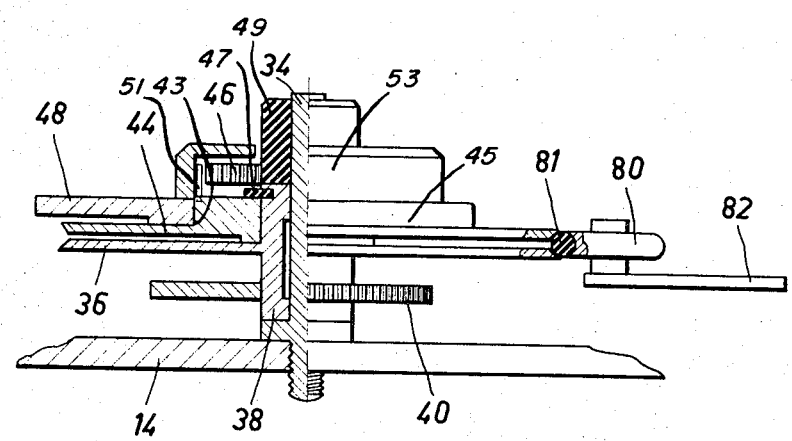
Figure 4:
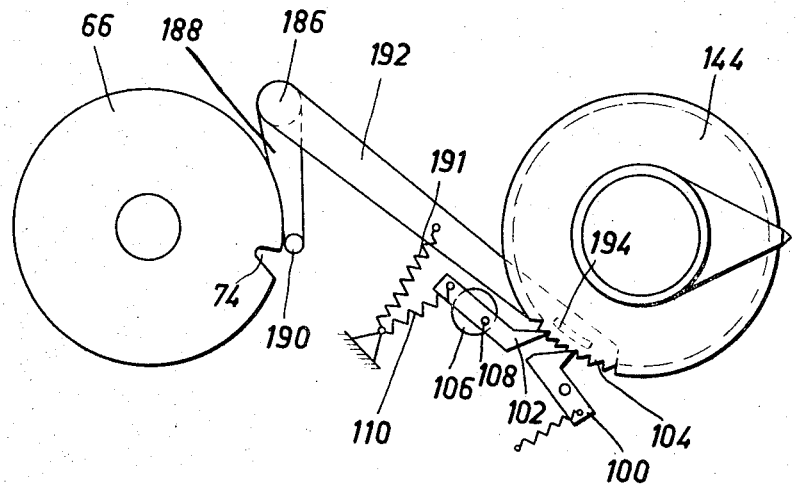
Figure 5:
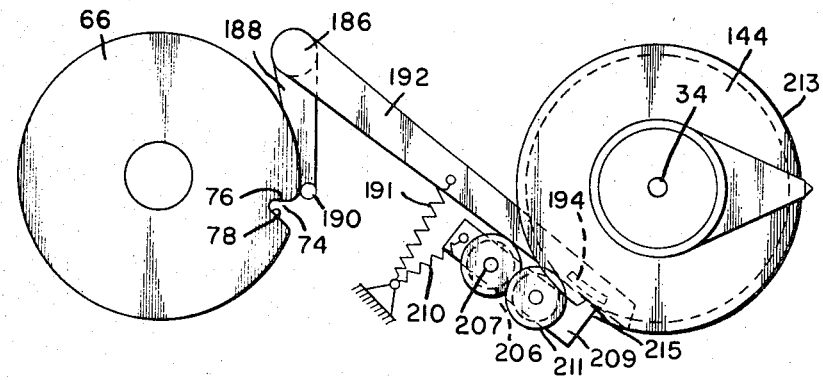
Figure 6:
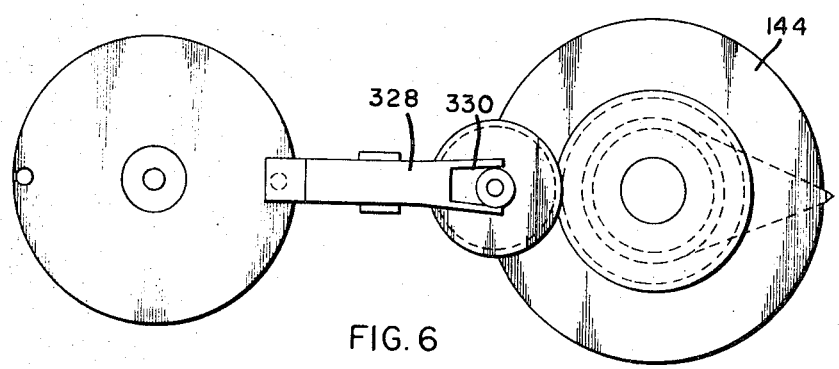
Figure 7:
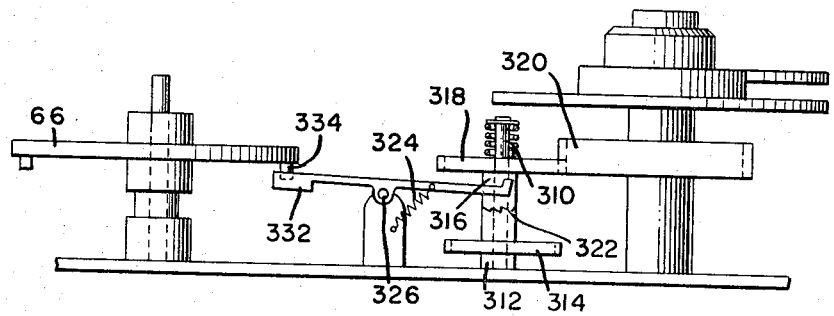

Further features and advantages of the invention will become apparent from the following description thereof with reference to the accompanying drawing, and from the appended claims. In the drawings:

FIG. 1 is an axial cross-section of an apparatus according to the invention;
FIG. 2 is a top view of the apparatus;
FIG. 3 is a cross-section of the meter-controlled switching mechanism of a second embodiment of the invention;
FIG. 4 is a top view of yet another embodiment of the apparatus according to the invention;
FIG. 5 is a top view of another embodiment of the apparatus according to the present invention;
FIG. 6 is a top view of still another embodiment of the apparatus according to the present invention; and
FIG. 7 is an axial view of the embodiment according to FIG. 6.

The apparatus shown in the drawings is arranged on a commercial water meter 2, of which only the upper part is shown in FIG. 1. The water meter has a cylindrical superstructure 4 which usually houses the measuring device. Surrounding this cylindrical superstructure 4 is an insulating bush 6 with an annular bush 8 located thereon;

this annular bush 8 is connected with a lower plate 10 of the apparatus. The connection may be made by means of a clamping screw. The plate is rotatable relative to the water quantity meter. An upper plate 14 is mounted in spaced relationship above the lower plate 10 by means of columns 12.

The upper surface of the plate 14 carries a commercial measuring device for a water quantity meter 2. The driven gear 18 of the vane-type measuring mechanism, usually mounted eccentrically in the cylindrical housing 4, meshes with a pinion 20 on a central shaft 22, located in the bottom 24 of the chamber receiving the measuring mechanism of the usual water meter. The spindle 26 of the gallons indicator 28, mounted centrally within the meter, is extended downwardly and located coaxially to the shaft 22. The upper end of the shaft 22 carries a coupling fork 30, whilst the spindle 26 carries at its lower end a coupling pin 32 which is entrained by the driven coupling fork 30 and which is preferably made from an insulating material.

The upper side of the plate 14 carries a fixed spindle 34 in spaced relationship from the shaft of the metering device. A metering disk 36 is rotatably mounted on this spindle 34 and is connected firmly with a gear 40 by means of a bush 38. The said gear 40 meshes with a further gear 42 meshing in its turn with one of the counter disks of the measuring device 26, say, for example, the tens or hundreds disk, according to the capacity of the softening plant. Thus, the rotation of the metering disk 36 and of the switching disk 44 coupled with the disk 46 through the roller 80 depends upon the flow quantity through the water flow meter. For example, with engagement with the tens counting disk, the metering disk may make one revolution for a flow quantity of 100 cubic meters, and with engagement with the hundreds disk one revolution for a flow quantity of 1000 cubic meters. Therefore, if in an embodiment wherein the disk makes one revolution for a flow quantity of 100 cubic meters, the regeneration shall commence after a quantity of 50 cubic meters has flown through; the arm 48 is adjusted relative to the disk 44 so that it comes into engagement with the switch arm 56. Thus, on engagement of the stop member 50 with the stop member 52 (FIG.. 2), the indicator will assume a twelve o'clock position. Accordingly, after a flow quantity of 75 cubic meters, the indicator would have to be adjusted to a three o'clock position and, after a flow quantity of 25 cubic meters, a nine o'clock position.

Mounted on the spindle 34 above the measuring disk 36 is a switching disk 44 equipped with a return spring 46, which is secured, at one end, to the fixed spindle 34 and, at the other end, to the disk 44. The switching disk 44 carries an adjustable switching arm 48 and a stop 50 which co-operates with a stop member 52. The stop member 52 (FIG. 2) is capable of pivoting about point P. It is retained by the spring and is provided with an abutment S to prevent pivoting of the stop member in a counter-clockwise direction. Mounted to the side of the said disks 36, 44 is a switch 54 with a switch arm 56 which co-operates with the point of the switching arm 48.

On the other side of the measuring device 16, there is a programming unit of known construction, with a drive motor 58, located between the two plates 10 and 14, a step-by-step switching unit 60, also arranged in this space, a switch with a holding contact 62, and a stepping unit switch 64. A program control disk 66, located above the plate 14, has a ring 68 of threaded bores adapted to receive control pins 70 which co-operate with a switching wheel 72 which actuates the stepping switch 64. The program disk 66 has a recess 74 on its periphery. The leading edge of this recess 74, viewed in the direction of rotation, forms a steep shoulder 76, whilst its trailing edge passes with a chamfer 78 into the periphery of the program disk, A coupling roller 80 co-operates with the outer periphery of the metering disk 36 and the switching disk 44. The outer periphery of this roller is provided with a friction coating, e.g., of rubber. The roller 80 is mounted rotatably on a two-armed lever 82 which is adapted to pivot about a pivot pin 84.

A release arm 88 is mounted on the plate 14 pivotably about a spindle 86, and carries at its outer end a roller 90, resting on the outer periphery of the programming disk 66. The release arm 88 has a laterally projecting lug which co-operates with the second arm of the two-armed lever 82. A spring 94 attached to the lug 92 biases the release arm 88 and holds the roller 90 against the periphery of the programming disk 68. A second spring 96 is arranged between the lug 92 and the adjacent arm of the lever 82 and produces a contact pressure for the roller 80, maintaining the same in contact with the outer periphery of the metering disk 36 and the switching disk 44.

The roller 90 of the release arm 88 is so located on the periphery of the programming disk 66 that, when the program has been completed, it is just in front of the recess 74.

The arrangement just described operates in the following manner:

The switching arm 48 is set at the predetermined position on the metering disk 44. The roller 80 rests under pressure on the outer periphery of the metering disk 36 and of the switching disk 44 and connects the same. The parts are in the position illustrated in FIG. 2.

After the passage of the predetermined quantity of water during which the metering disk 44 has revolved in a counter-clockwise direction, the switching arm 48 actuates via the arm 56 the switch 54, causing the programming motor 58, driving the programming disk 66, to be energized. The programming disk 66 revolves in an anti-clockwise direction, as shown by the arrow. The rotation of the programming disk causes the switch arm of the holding switch 62, located with a follower roller in the recess 74, to be pivoted and the holding contact 62 for the circuit of the motor 58 to be held closed. Immediately thereafter, the roller 90 of the release arm 88 drops into the groove 74. The lug 92 abuts on the adjacent arm of the lever 82 and lifts the roller 80, causing the spring 96 to be briefly closed. The lifting of the roller 80 enables the switching disk 44 to return into the starting position under the action of the return spring 46, in which the pin 50 rests on the right side of the stop member 52. The said stop member 52 is preferably so constructed that it can pivot in a clockwise direction (as viewed in the drawings) so that the stop member 52 is pivoted about point P and evades the path of the stop member 50 if the stop member continues to run, for example, in case of a power failure wherein disks 36 and 44, driven by the measuring device, would continue to revolve.

During the further movement of the programming disk 66, the roller 90 moves over the chamfer 78 again to the outer periphery of the programming disk 66 so that the release arm 88 is again pivoted in the anticlockwise direction and the coupling roller 80 makes again contact. This coupling is made within a short time after the starting up of the programming unit so that the quantity of water passing during the regeneration process is again measured immediately. In this manner, the apparatus according to the invention may also be used in continuously operating plants in which two water softeners are used.

Naturally, the programming disk may have a construction different from that shown in the drawing. Thus, for example, the outer cam may be replaced by an internal cam, having, e.g., a periphery corresponding to the effective length of the switching groove 74. In this case, the spring 94 must act on the actual switching arm and bias the same in the direction opposite the clockwise sense, and a stop would have to be provided for the arm.

Due to the central arrangement of the take-off spindle 22 of the water meter 2 in conjunction with the mounting by means of cylindrical members 4, 8, the apparatus may be adjusted anywhere relative to the longitudinal axis of the water meter. The insulating bush 6 and the configuration of the coupling pin 32 prevent electrical contact between the water meter and the apparatus, so that, when the housing of the apparatus is made of aluminium, stress corrosion cannot occur.

FIG. 3 shows a modification of the coupling between the metering disk 36 and the switching disk 44. The peripheries of both these disks are of conical configuration, such that a groove is formed. The coupling roller 80 has in this embodiment a peripheral O-ring of elastic material; this O-ring 81 engages into the groove and exerts a force component in the axial direction of both disks, whereby the switching plate 44 is slightly tilted and is thereby locked against the bush 38, carrying the metering disk 36, and also rotatably the switching disk 44. In this way, the coupling is not made exclusively by peripheral frictional forces, so that the contact pressure of the coupling roller may be smaller, reducing in turn also the contact pressure of the roller 80 on the periphery of the switching disk and thus the bearing load affecting the programming unit.

The disk 44 is mounted freely rotatably on the bush 38, which is firmly connected with the gear 40 and the disk 36, the disk 36 being secured against upward motion by means of a clip 47. A ring 45 is mounted upon a shoulder 43 of the disk 44, the ring 45 being friction-tight and carrying the arm 48, which is adjustable by means of rotation relative to the disk 44. A bush 49, of synthetic material, is pressed onto the upper end of the fixed spindle 34, and the inner end of a spring 46 is secured to the bush 49. The other end of the spring is firmly connected with the disk 44, for example, by means of the pin 51. The spring is covered by a hood 53 which is firmly connected with the ring 45.

FIG. 4 shows an embodiment in which the metering disk 36 has been eliminated. In this construction, only the switching disk 144 is freely rotatably mounted on a fixed shaft and biased by a return spring. The movement of the switching disk 144 is produced by means of a ratchet mechanism, comprising a holding ratchet 100 and a switching ratchet 102. The switching disk 144 has a corresponding toothing 104 over its periphery. The switching gear is driven by a gear 106 driven in turn by the metering device, and on which the switching ratchet, biased by a spring 110, is eccentrically mounted. During one revolution of the said gear 106, the switching wheel 144 is advanced by one tooth. The release arm 188 rests again through a roller 190 on the periphery of the programming disk, provided with a groove 74. In this construction, the release arm 188 is a crank lever, the second arm 192 of which engages under or over the switching disk 144 and carries a follower 194 which is associated with the ratchets. The arm 192 of the release arm is biased by a spring 191. When the roller 190 engages into the groove 74, the release arm pivots in the clockwise direction and disengages via the follower 194 the two ratchets 100, 102 from the switching wheel so that the same can be returned into the starting position by the return spring. Then the ratchet mechanism is again moved into its operating state by the roller 190 returning to the periphery of the programming disk.

The embodiment illustrated in FIG. 5 corresponds generally to that illustrated in FIG. 4. A gear 206 of the metering device is rotatably mounted upon a fixed shaft 207; a swinging level 209 is pivotally mounted upon the fixed shaft 207. A further gear 211 is rotatably mounted on the lever 209, which gear meshes with the gear 206.

The swinging level 209 is biased by means of a spring 210, toward rotation about shaft 207 in a counter-clockwise direction, so that the gear 211 comes into engagement with a toothing 213 on the perpihery of the disk 144. A projection 215 of the swinging level 209 lies in the path of the follower 194 of the release arm 192. If the roller 190 engages within the groove 74 of the disk 66, the lever 209 is swung in a clockwise direction by means of the nose or follower 194, and the gear 211 comes out of engagement with the toothing 213 so that the disk, under the action of the return spring, can return to its initial position. Instead of a toothing on the outer periphery of the disk 144, a separate gear may be provided, on the bush by which the disk 144 is mounted upon the fixed spindle 34 as seen in FIG. 3, illustrating an embodiment having two coupled disks. In the embodiment according to FIGS. 6 and 7, the gear 314, rotatably mounted upon the fixed spindle 310 by means of a bush 312, corresponds to the gear 42 of the embodiment illustrated in FIGS. 1 and 2. A further gear 318 is rotatably mounted upon the spindle 310 by means of a bush 316 above the gear 314, the gear 318 being in continuous engagement with a gear 320 firmly connected with the disk 144. The two bushes 312 and 316 carry, on their adjacent end faces, a conventional coupling toothing 322. The coupling is held in engagement by means of a spring 324.

A swingable lever, constructed as a two-armed release lever 328, is provided for releasong the clutch. The lever engages the gear 314 from below by means of two fingers. At its other end, the lever 328 is provided with an inclined surface in the path of a cam 344 provided at the underside of the disk 66 by which cam, that arm of the two-armed lever which is below the gear is swung upwardly when the disk 66 starts revolving, thus releasing the clutch 322 so that the disk 144 can return to its initial position. The height of the gear 320 is dimensioned so that the gear 320 will not come out of engagement with the gear 314 upon lifting of gear 314.

In a further embodiment, not shown in the drawing, the driven gear of the metering device is mounted on a spindle on a rocker, located on the shaft of the upstream gear, carrying also a friction wheel which co-operates with the outer periphery of the switching disk. The outer periphery of the switching disk, as well as the outer peripheries of the switching and metering disks in the embodiments of FIGS. 1 to 3, may here be smooth or serrated.

In a modification of this embodiment, illustrated in FIGS. 6 and 7 and described hereinabove with reference to these figures. the driven gear of the metering device, mounted on the rocker, may also co-operate directly with the switching disk, which would then have a peripheral toothing.

Finally, it is also possible, when the metering disk is eliminated, to connect the switching disk, in the same manner as the metering disk of FIGS. 1 to 3, firmly with a gear rotatable about the axis of the switching disk and to provide, within a gear train, a gear or a combination of pinion and gear, with a disengageable axial clutch coupling, which would then be actuated by the release arm. After this axial clutch coupling has been disengaged, the switching gear could be returned to its starting position by the return spring. In this embodiment, the release arm could be pivtable about a horizontal axis and co-operate with a face cam of the programming disk. Also here, intermediate levers can be provided.

I claim:

1. A water flow meter-controlled programming device for water softening plants, comprising a metering device including reduction gears, a switching disk driven by a drive gear of the metering device reduction gear, a programming disk, a return spring operatively connected, at one end thereof, with said switching disk and, at the other end thereof, with a fixed member, an adjustable switching finger, mounted on switching disk, selectively engageable mechanical coupling means for transmitting the movement of said drive gear to said switching disk, a release finger for said coupling means, and cam means for controlling said release finger as a function of the motion of said programming disk.

2. A device according to claim 1, wherein said coupling means includes a metering disk coaxially disposed below said switching disk and driven gear means firmly secured to said metering disk and driven by said reduction gears, wherein said switching disk and said metering disk are substantially equal in diameter and said coupling means includes a friction wheel resting, under pressure, against the periphery of said switching disk and said metering disk and capable of being pivoted out of engagement therewith by said release finger.

3. A device according to claim 2, wherein the peripheral surfaces of said switching disk and said metering disk have conical configuration and the periphery of said friction wheel is rounded.

4. A device according to claim 3, wherein said coupling means includes two-armed lever means, said friction wheel being mounted rotatably on one arm of a said lever means, the other arm of said lever means co-operating with a lug of said release finger.

5. A device according to claim 4, wherein said coupling means includes a biasing spring for said friction wheel, said spring being mounted between said lever means and said lug of said release finger.

6. A device according to claim 1, wherein said programming disk includes a groove therein, said release finger engaging at the periphery of said disk within said groove.

7. A device according to claim 6, wherein said groove, viewed in the direction of rotation of said programming disk, has a steep leading shoulder portion.

8. A device according to claim 7, further including holding switch means having an actuating arm positioned within said groove when said programming device is inoperative.

9. A device according to claim 1, wherein said coupling means includes ratchet toothing on the periphery of said switching disk, said mechanical coupling means including a ratchet mechanism having a holding ratchet and a switching ratchet driven by said metering device, said release finger including means for disengaging said switching ratchet from said switching disk.

10. A device according to claim 1, wherein said coupling means includes driven gear means mounted upon a rocker disposed upon a shaft of the upstream gear of said reduction gears, said driven gear means operatively interconnected with said switching disk.

11. A device according to claim 10, wherein said switching disk includes a toothing which meshes with said driven gear means.

12. A device according to claim 11, wherein said toothing is provided on the outer periphery of said switching disk.

13. A device according to claim 11, wherein said switching disk is connected with a gear mounted coaxially therewith.

14. A device according to claim 1, wherein said switching disk is connected directly with said metering device through a toothing and one of said reduction gears is provided with a selectively disengageable axial clutch.

References Cited

UNITED STATES PATENTS 3,079,812   3/1963   Bross _____ 74—3.5 X

MILTON KAUFMAN, Primary Examiner

U.S. Cl. X.R.

200—38